United States Patent
Silventoinen et al.

(10) Patent No.: US 6,594,250 B1
(45) Date of Patent: Jul. 15, 2003

(54) METHOD OF MONITORING BASE STATIONS WITH DISCONTINUOUS CONTROL CHANNEL TRANSMISSIONS

(75) Inventors: Marko Silventoinen, Helsinki (FI); Markku Rautiola, Tampere (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/308,371

(22) PCT Filed: Nov. 14, 1996

(86) PCT No.: PCT/EP96/05012

§ 371 (c)(1),
(2), (4) Date: Sep. 8, 1999

(87) PCT Pub. No.: WO98/21909

PCT Pub. Date: May 22, 1998

(51) Int. Cl.[7] .............................................. H04B 7/212
(52) U.S. Cl. ......................... 370/347; 370/458; 370/459
(58) Field of Search ................................ 370/312, 314, 370/328, 334, 336, 337, 343, 345, 347, 350, 432, 436, 437, 442, 458, 459, 478, 480, 498, 503, 507, 509, 510, 512, 520; 455/436, 437, 442, 9, 502, 515, 67.1, 115, 161.1, 226.1, 226.2

(56) References Cited

U.S. PATENT DOCUMENTS 5,517,675 A * 5/1996 O'Connor et al. .......... 455/437

FOREIGN PATENT DOCUMENTS

| EP | 0645903 A1 | 9/1994 | |
|---|---|---|---|
| WO | WO 96/21987 | 7/1996 | |
| WO | WO 96/34468 | * 10/1996 | ............. H04J/3/16 |

* cited by examiner

Primary Examiner—David Vincent
Assistant Examiner—Phirin Sam
(74) Attorney, Agent, or Firm—Antonelli, Terry, Stout & Kraus, LLP

(57) ABSTRACT

A method for monitoring with discontinuous BCCH carriers in GSM, in which a mobile station can monitor a neighboring base station in each frame, or one in each frame. i.e. once in 4.615 ms, even where the base stations do not transmit continuously on a beacon carrier. Control information is intermittently transmitted from one or more base stations to one or more mobile stations. Traffic information is transmitted between the base station and the mobile station. The base station using n (n less than 8) time slots of a TDMA frame. The base station is monitored by the mobile station within a predetermined time slot of the TDMA frame during which the base station transmits additional information that is neither control information nor traffic information. The monitoring by the mobile station during the predetermined time slot (TS) is synchronized with the monitoring of further provided mobile stations.

20 Claims, 3 Drawing Sheets

BASE STATION BS

| TX BCCH | TX TCH | | RX RACH | RX TCH | | TX ADD | |
|---|---|---|---|---|---|---|---|

TS0 ........................................................... TS7

MOBILE STATION MS

| | RX | | | TX | | MONI-TOR | |
|---|---|---|---|---|---|---|---|

TS0 ........................................................... TS7

FIG. 1
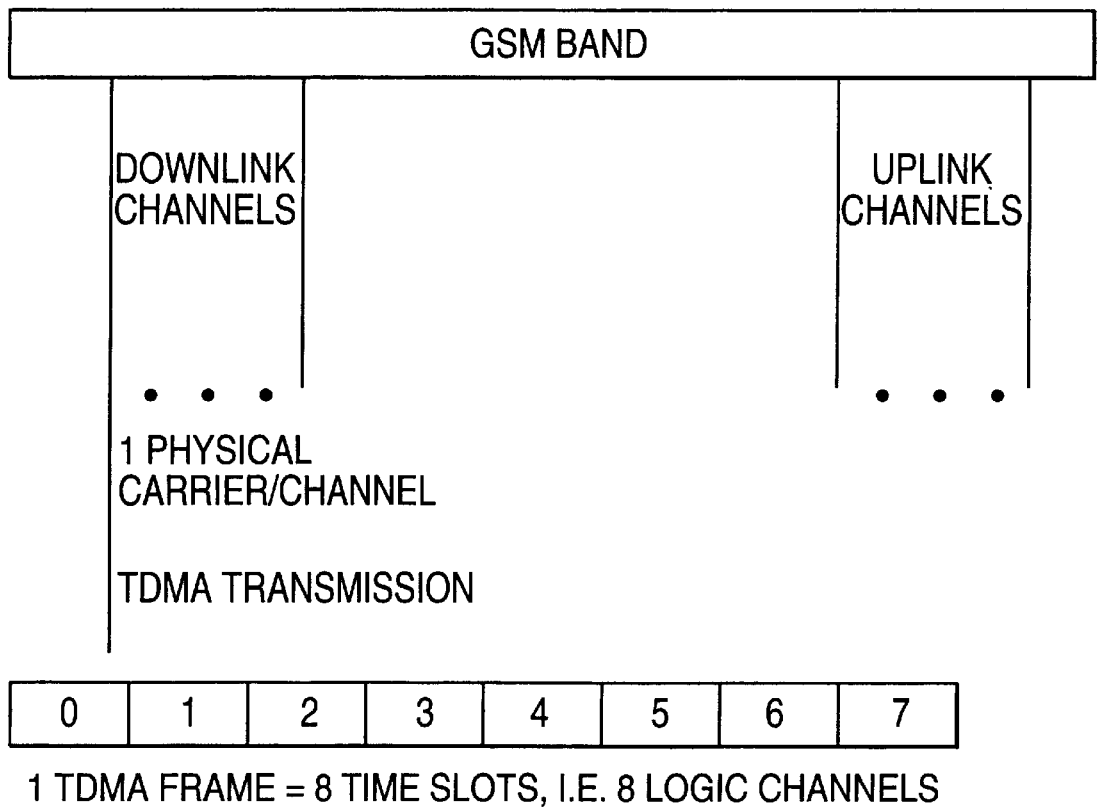
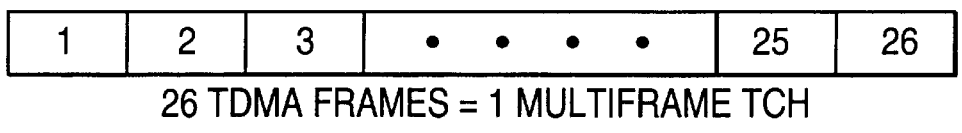
26 TDMA FRAMES = 1 MULTIFRAME TCH
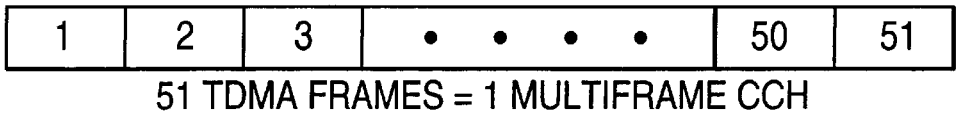
51 TDMA FRAMES = 1 MULTIFRAME CCH

FIG. 3
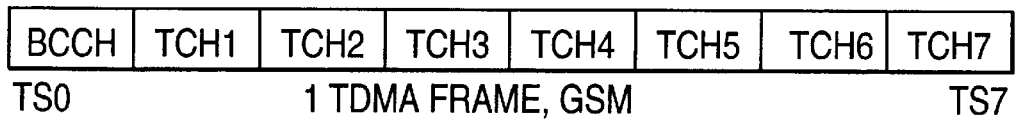
FIG. 4
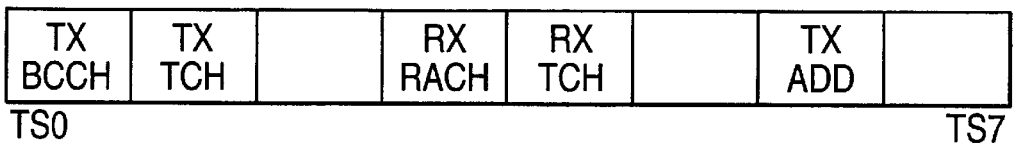
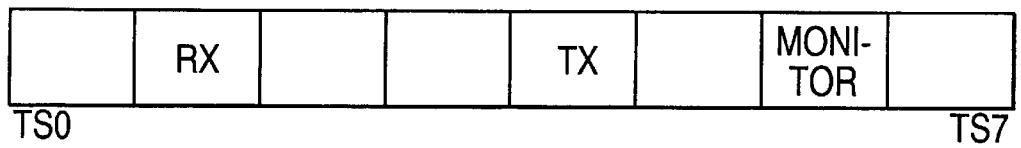
FIG. 5
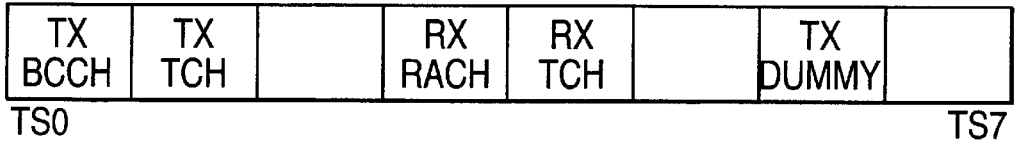
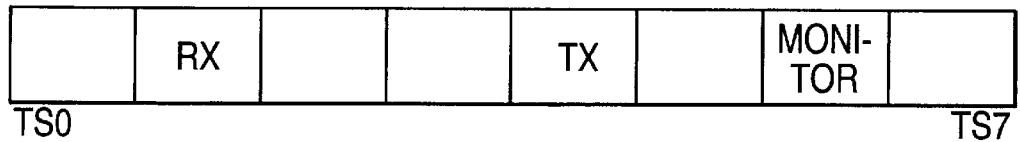

METHOD OF MONITORING BASE STATIONS WITH DISCONTINUOUS CONTROL CHANNEL TRANSMISSIONS

FIELD OF THE INVENTION

The present invention relates to a method for monitoring BCCH carriers in GSM, and in particular to a method to control monitoring with discontinuous BCCH carriers in GSM.

BACKGROUND OF THE INVENTION

In recent years, mobile telecommunication systems have become increasingly popular based on usefulness and commonly availability. Moreover, a continued increase in the need for such systems and additional services associated therewith is expected for the near future.

One of the most widely spread and presently available mobile telecommunication systems is the so-called GSM system ("Groupe Speciale Mobile") which meanwhile has become a common standard in European countries.

In general, in a mobile telecommunication system such as the GSM system, a mobile station MS, whether in a standby mode or in use, has to continuously communicate with a base transceiver station BTS or base station BS, respectively, in order to provide at any time the possibility to establish a radio link, i.e. to initiate or receive a call.

In connection with such a communication between the mobile station MS and the base station BS, information relating to the so-called radio link control process, like data necessary for control processes like power control (PC) of the used transmitters and handover (HO) of the mobile station MS from the currently associated base station BS to a neighbouring base station, are acquired, transmitted and evaluated. These above mentioned control processes performed in connection with the radio link control process are managed and effected by a so-called base station controller BSC superordinated to the base stations.

To this end, according to the GSM standard, the mobile station MS is required to monitor the received power levels of up to 32 neighbouring base stations BS and to transmit the received power levels of the six strongest neighbours and the corresponding signal quality to the base station BS it is presently allocated to.

Those measurements on the radio interface are effected for each radio link of a mobile station MS on a signalling channel and/or traffic channel associated to the respective mobile station MS, i. e. for each radio link between a mobile station and a base station BS it is presently allocated to and neighbouring base stations.

As to the transmission system according to GSM, it is distinguished between logic channels of different kinds, namely, between so-called traffic channels (TCH) and signalling channels also referred to as control channels (CCH).

Traffic channels (TCHS) are used for transmitting speech or data. The traffic channels have data rates of 13 kbit/s (full rate channel) or 6.5 kbit/s (half rate channel) for speech transmission, and a data rate between 2.4 kbit/s and 9.6 kbit/s for data transmission (at full rate) or up to 4.8 kbit/s (at half rate).

Control channels (CCHs) are used for transmitting control signals required for establishing and/or maintaining a radio link between the mobile station MS and the base station(s) BS. Among the control channels different types of control channels are distinguished, namely, e. g.

Broadcast CHannels (BCH),
Common Control CHannels (CCCH), and
Dedicated Control channels (DCCH).

Broadcast channels BCH are directed from a base station BS to a mobile station MS in a so-called downlink. Within a broadcast channel BCH it can be distinguished between a Frequency Correction CHannel (FCCH) for frequency synchronization of the MS with the BS, a Synchronization CHannel (SCH) for subsequently effecting a bit-synchronization of the MS with respect to the BS (i.e frame synchronization), and a Broadcast Control Channel (BCCH) used for transmitting the basic information required by the mobile station MS for communication with the base station(s) BS. After all synchronizations have been effected, the MS can evaluate all received BCCH information necessary for the communication.

The Common Control CHannel (CCCH) is used for radio link establishment and includes a paging channel (PCH) and an access grant channel (AGCH) in downlink direction, and an random access channel (RACH) in uplink direction.

The dedicated control channels include a stand alone dedicated control channel (SDCCH) and an Associated Control CHannel (ACCH), the latter of which comprises the Fast Associated Control CHannel (FACCH) and the Slow Associated Control CHannel (SACCH), respectively accompanying a traffic channel TCH and used in connection with an assignment of a TCH or at handover (FACCH) or for measurement result transmission (SAACH).

The channels briefly described above each are logical channels which are mapped to physical channels of the GSM radio frequency band, respectively, with the GSM radio frequency band being divided in a downlink frequency band for BS to MS communications and an uplink frequency band for MS to BS communication.

Now, with respect to the data transmission method used on the respective (physical) channels, due to the fact that a mobile station MS uses only part time for transmitting/receiving of information and uses remaining time for effecting measurements of the kind briefly described above, a channel (carrier) assigned thereto is not continuously used by the mobile station MS for communication.

Therefore, a (physical) channel or carrier, respectively, has been made available to other stations for data transmission during the time (a first) mobile station MS effects measurements, by adopting the TDMA method (Time Divisional Multiple Access) for data transmission on the respective physical channel.

Thus, a mobile station uses a physical channel or carrier, respectively, intermittently, and the base station may communicate continuously with several mobile stations using a single carrier. Alternatively, a BS may communicate with several mobile stations MS using multiple carriers in a case of frequency hopping, for example.

To state this in greater detail, in mobile communication systems adopting the TDMA method a time-divisional communication takes place on the respective channel or carrier frequency, respectively, in consecutive so-called TDMA frames. A single TDMA frame consists of several so-called time slots TS of predetermined duration during which different contents of information referred to as a burst is transmitted. In particular, according to GSM standard, a time slot TS has a duration of 576,9 µs and eight consecutive time slots constitute a TDMA frame having a duration of 4.615 ms. Furthermore, the TDMA-frames consisting of eight time slots TS each are grouped to form multi-frames consisting of 51 TDMA-frames in case of a control channel CCH and 26 TDMA-frames in case of a traffic channel TCH.

The general concept of this conventional (Prior Art) hierarchy briefly described above is schematically depicted in FIG. 1 of the accompanying drawings.

Within the respective time slots TS of the frames information is transmitted as the above mentioned so-called bursts. Five different types of bursts are defined, namely normal burst NB frequency correction burst FB synchronization burst SB dummy burst DB, and access burst AB.

The FB, SB and AB burst, respectively, are bursts transmitted when a radio link is being established. After a link has been established, the further communication and exchange of information is effected using normal bursts. The dummy burst is transmitted when a transmission is not effected in all time slots of the BCCH carrier (the so-called beacon carrier).

Thus, one physical channel or carrier, respectively, supports a minimum number of at least 8 logical channels (1 logical channel corresponding to one time slot) (or 16 logical channels in case of the above mentioned half-rate transmission). Stated in other words, a single carrier supports a couple of connections. e. g. 8 connections, simultaneously, one for BCCH and the remaining for TCHs.

On the respective broadcast control channel BCCH general information concerning the base station is transmitted and the mobile station must measure the received power of the BCCH carrier of the neighbouring base stations and decode the BCCH signal of the neighbouring cells.

To this end, according to the GSM specification, the carrier on which the BCCH channel resides must be transmitted continuously with constant power and at a standard frequency. In particular, the BCCH carrier on which the BCCH channel is transmitted has to be transmitted in all time slots, since the measurement of the received signal level of the neighbour cells of the MS rely thereon.

As already stated hereinabove, in current BTS the minimum number of channels is 8, namely 1 for BCCH and the rest for TCHs.

However, in various future scenarios the GSM BTS is required to support less than 8 connections simultaneously. For example in scenarios like Home Base Station of Office BTS, the presently available capacity of 8 simultaneous connections exceeds the need, thus being a non-optimum solution. For those scenarios an optimum solution has only one or two traffic channels TCHs. Consequently, this requires the use of only two time slots TS out of the eight time slots provided in the carrier and/or channel to be used for transmission.

In particular, those so-called dual slot BTSs are, by definition, not able to transmit on all time slots, but only in two or three out of eight, thus violating the GSM specifications requiring the BTS to transmit on all the time slots of the beacon carrier (BCCH carrier on which the BCCH is transmitted). The reason for this lack of capability of transmitting on all time slots of the beacon carrier is an economical one, since it is much cheaper to produce a BTS with reduced transmitting capacity. Stated in other words, if the capacity requirements are so low that only one TCH is needed in the BTS, it is an economically sound idea to produce a low-cost with a hardware limited capability to transmit only on three time slots out of eight.

Those dual-slot BTSs can therefore be derived from a mobile station MS in a cost efficient way, thus reducing the price of the BTS considerably.

However, if only one or two slots within a TDMA-frame having eight time slots are used, there will not be continuous transmission on the beacon carrier (the carrier the BCCH resides).

In general, the mobile station MS has time to monitor in all time slots TS once in the 26-frame multiframe. Stated in other words, once in approximately 120 ms a BTS or BS respectively, that does not send when MS normally listens can be monitored. That is, if the BTS does not transmit in that specific time slot TS the mobile station MS has reserved for monitoring the neighbour cells (i.e. the time slot TS 2 slots after the transmission slot) the mobile station MS has no means to measure the received signal strength from that BTS in a normal way, but has to wait until the $26^{th}$ frame in the 26-frame multiframe.

This rate, however, is two slow for practical purposes: all the six neighbour base stations BS of the mobile station can only be monitored once in 0.72 s.

SUMMARY OF THE INVENTION

It is therefore an object of the present invention to provide a system, in which a mobile station MS can monitor a neighbouring base station BS in each frame, or one in each frame, i.e. once in 4.615 ms, even if the base stations do not transmit continuously on the beacon carrier.

This object is achieved by a system operating according to a method for monitoring at least one base station with discontinuous beacon carrier by at least one mobile station (MS), wherein control information is intermittently transmitted from said at least one base station to said at least one mobile station; traffic information is transmitted between said at least one base station and said at least one mobile station, said at least one base station using n (n being an integer less than 8) time slots of a TDMA frame; and said at least one base station is monitored by said at least one mobile station within a predetermined time slot of the TDMA frame during which said at least one base station transmits information.

More particularly, by synchronization of the transmission of the BS. Which force all mobile stations in the system to monitor at the same time, i.e. at the time of transmission by the BS, the present invention provides a system in which the mobile station can monitor neighbouring base stations in each frame at a rate suitable for practical purposes.

Consequently, a cost effective BTS system of so-called dual slot BTSs can be derived in which the monitoring of neighbouring base stations is satisfactorily achieved at a rate high enough for practical purposes and which can be applied in the field of Home Base Stations.

Additionally, since the BS does not send and/or receive within all time slots, the BS has time to send an additional burst (e.g. dummy burst) at the time the mobile stations MS are monitoring. Therefore, no additional or specially adapted hardware is necessary in the BS to perform the control method according to the invention.

BRIEF DESCRIPTION OF THE DRAWINGS

In the following, the present invention will be described in greater detail with reference to the accompanying drawings, in which:

FIG. 1 exemplifies the hierarchical structure of time slots TS, TDMA-frames, and multiframes on a carrier frequency of the GSM frequency band according to the conventional GSM specification;

FIG. 3 shows an example of a timing diagram of signal transmission from a base station within a TDMA-frame, illustrating a scheme adopted according to GSM standard;

FIG. 4 shows a timing diagram of the timing of a mobile station MS and base station BS as to transmission, reception and monitoring in conformity with the novel scheme according to a first embodiment of the present invention;

FIG. 5 shows a timing diagram of the timing of a mobile station MS and BS transmission, reception and monitoring in conformity with the novel scheme according to a second embodiment of the present invention;

DETAILED DESCRIPTION OF PREFERRED EMBODIMENTS

Figure 2:
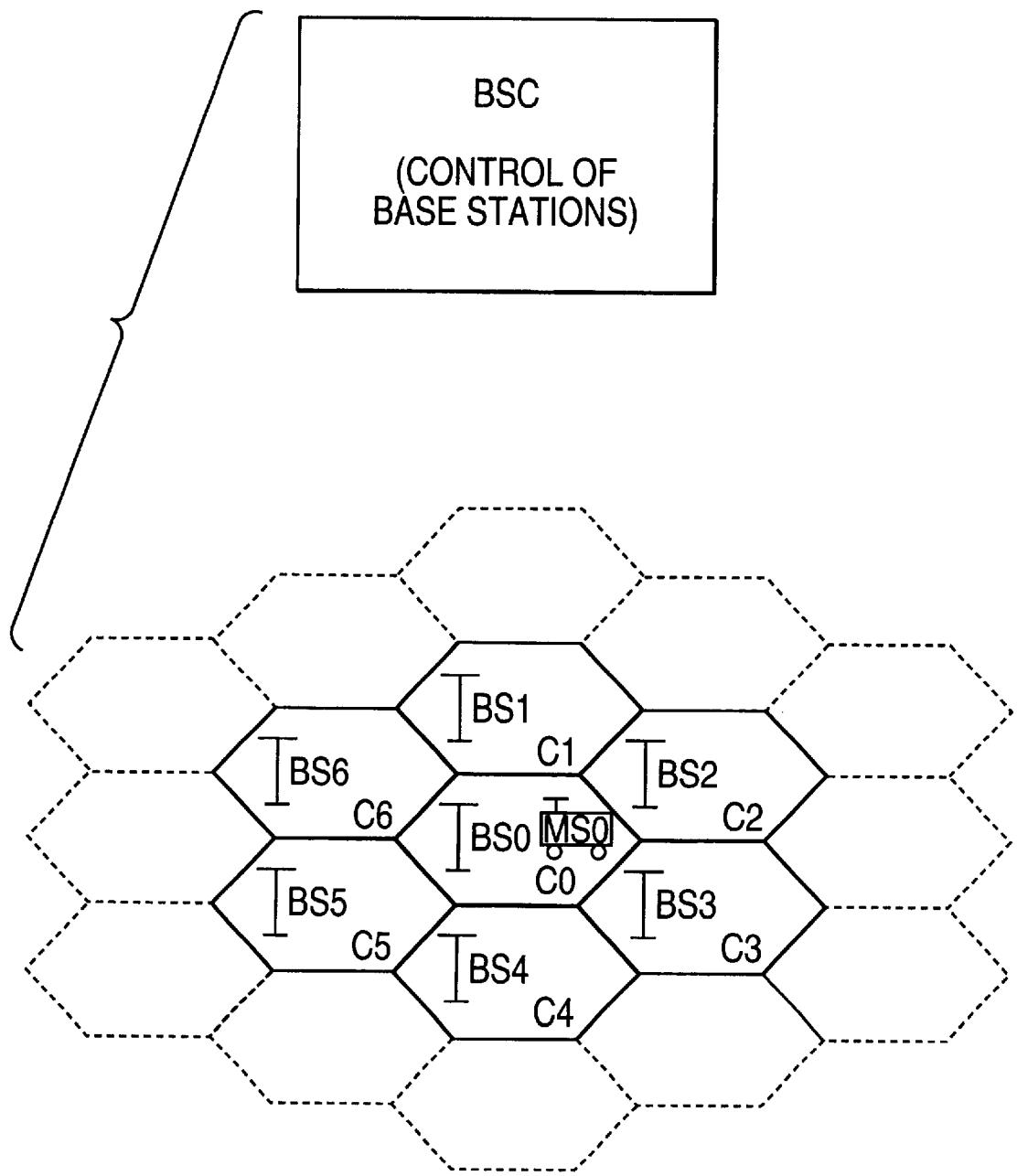
FIG. 2 schematically depicts a mobile station MS associated to a base station BS in a respective cell together with neighbouring base stations of peripheral cells.

In the following, preferred embodiments of the present invention will be described in detail with reference to the accompanying drawings.

According to FIG. 2, in a specific arrangement chosen as an example only for explaining the present invention, it is assumed that at least one mobile station MS0 is in the range of and/or allocated to a base station BS0 in a cell C0. In further cells C1 to C6 neighbouring the cell C0, respective base stations BS1 to BS6 are provided for establishing communication with said mobile station MS0 for which a handover process may be effected in case it is moving within and/or between the cells.

Each of the base stations BS0 to BS6 transmits the broadcast control channel BCCH to the mobile station in order that the mobile station MS0 may effect the necessary measurements and receive the information required, for example, for judging the necessity of a handover. The measurement results of the mobile station MS are transmitted to the base stations and further transmitted to the superordinated base station controller BSC controlling the radio link process (e.g. handover HO).

The communication established between the respective BS and MS is performed according to the conventional TDMA scheme previously described with reference to FIG. 1.

As shown in FIG. 3, GSM according to the conventional TDMA transmission scheme normally supports up to eight simultaneous connections, i.e. one for BCCH and 7 for traffic channels TCH, as already stated above. In a corresponding TDMA frame with associated bursts transmitted therein, in accordance with TDMA mobile system, at least one time slot of a frame (TSO) is a control channel in which a base station transmits control information, i.e. the BCCH. Accordingly, since all time slots in a frame are used for transmission throughout subsequent frames, continuous transmission on the beacon carrier is assured.

However, in case of a scenario, in which a base station is only required to support a couple of connections (less than seven) simultaneously, there will not be continuous transmission on the carrier referred to as beacon carrier any longer, since not all time slots are used for transmission.

FIG. 4 illustrates such a situation, in which only one connection or radio link, hence, a single traffic channel is supported by the base station.

Therefore, in order to monitor a base station in each frame, a synchronization of the transmission of the base stations is effected, thus forcing all mobile stations in the system to be synchronized as well and to monitor at the same time.

Stated in other words, the base station transmission as well as the mobile station monitoring is synchronized with each other. Moreover, in case of a single base station only, monitoring by one (or all synchronized) mobile station(s) is performed during a predetermined time slot during which the base station transmits.

FIG. 4 shows a first specific embodiment according to the present invention. In this case, the mobile stations MS monitor in synchronism with the transmission of the (synchronized) base stations BS, namely, the base stations and the mobile stations perform transmission and monitoring during the same predetermined time slot, respectively.

In addition, due to the fact that not all time slots within a frame are used for transmission, in such a case there is still at least one time slot unused.

To be precise, as depicted in FIG. 4, the synchronized base stations can send an additional burst exactly at the time when the mobile stations MS are forced to perform monitoring. Such an additional burst is transmitted in an unused or free time slot not required for use in case of the dual slot base stations, for example. Therefore, the normal data transmission using two time slots out of eight is not deteriorated or affected even in case an additional burst is transmitted.

FIG. 5 shows a second embodiment of the present invention. According to the second embodiment, rather than use an additional burst, a transmitted dummy burst may be used instead.

The above mentioned additional burst and/or the dummy burst transmitted may be used only for received signal strength measurements, but, alternatively, may also contain a bit pattern specifically chosen for this purpose in order to support the monitoring. For instance, the bit pattern may represent some useful information as for example, a Base Station Identification Code (BSIC).

Furthermore, in order to effect the synchronization of the transmission of the base stations, the base station controller BSC is required to transmit a suitable synchronization signal to the respective base stations and mobile stations. Such a synchronization signal may be an additional signal to be transmitted. Alternatively, the required synchronization could be achieved in combination with the time alignment process for time slot adjustment between the MS and BS.

As practical ways to synchronize the base transceiver stations (BTS), for example where the BTSs are connected in the same (Pulse Code Modulation) PCM line, the PCM line can be used to carry the synchronization information. Moreover, the BTS may comprise a GPS (Global Positioning System) receiver providing the accurate synchronization. Furthermore, if the BTSs have the same BSC, the BSC may provide the synchronization information. Additionally, the synchronization between MS and BTS may be achieved according to the standard method according to GSM specification GSM 05.10.

Therefore, due to the synchronization between the BTSs and between the BTS and MS, also the MSs are in synchronization because of that.

Moreover, in case only two time slots out of eight are used in a dual slot scenario, there also exists the possibility for a further BS transmitting information on the carrier.

It should be understood that the above description and accompanying figures are intended to illustrate the present invention by way of example only. Thus, the method according to the invention may also be used in systems other than the described GSM system. The preferred embodiments of the method may thus vary within the scope of the attached claims.

What is claimed is

1. A method of monitoring at least one base station (BS) with discontinuous beacon carrier by at least one mobile station (MS), wherein
   control information (BCCH) is intermittently transmitted from said at least one base station (BS) to said at least one mobile station (MS);
   traffic information (TCH) is transmitted between said at least one base station (BS) and said at least one mobile station (MS), said at least one base station using n (n being an integer less than 8) time slots of a TDMA frame; and
   said at least one base station (BS) is monitored by said at least one mobile station (MS) within a predetermined time slot of the TDMA frame during which said at least one base station (BS) transmits additional information the additional information being neither control information nor traffic information, the monitoring by said at least one mobile station (MS) during said predetermined time slot (TS) being synchronized with the monitoring of further provided mobile stations.

2. A method of monitoring according to claim 1, wherein the transmission of the additional information by said at least one base station (BS) is synchronized with the transmission of further provided base stations.

3. A method of monitoring according to claim 1, wherein
   the monitoring by said at least one mobile station (MS) during said predetermined time slot (TS) is synchronized with the monitoring of further provided mobile stations.

4. A method of monitoring according to claim 1, wherein:
   an additional burst is transmitted by said at least one base station (BS).

5. A method of monitoring according to claim 4, wherein said additional burst is a dummy burst (DB).

6. A method of monitoring according to claim 4, wherein: said additional burst contains useful information.

7. A method of monitoring according to claim 6, wherein said useful information represents the Base Station Identification Code (BSIC).

8. A method of monitoring according to claim 1, wherein: said integer n is one or two.

9. A method of monitoring according to claim 2, wherein:
   an additional burst is transmitted by said at least one base station (BS).

10. A method of monitoring according to claim 9, wherein:
    said additional burst is a dummy burst (DB).

11. A method of monitoring according to claim 10 wherein:
    said additional burst contains useful information.

12. A method of monitoring according to claim 11, wherein:
    said useful information represents the Base Station Identification Code (BSIC).

13. A method of monitoring according to claim 12, wherein:
    said integer n is one or two.

14. A method of monitoring according to claim 3, wherein:
    an additional burst is transmitted by said at least one base station (BS).

15. A method of monitoring according to claim 14, wherein:
    said additional burst is a dummy burst (DB).

16. A method of monitoring according to claim 15, wherein:
    said additional burst contains useful information.

17. A method of monitoring according to claim 16, wherein:
    said useful information represents the Base Station Identification Code (BSIC).

18. A method of monitoring according to claim 17, wherein:
    said integer n is one or two.

19. A method of monitoring according to claim 5, wherein:
    said additional burst contains useful information.

20. A method of monitoring according to claim 7, wherein:
    said integer n is one or two.

* * * * *